United States Patent
Kim et al.

(10) Patent No.: US 10,982,735 B1
(45) Date of Patent: Apr. 20, 2021

(54) POWER TRAIN FOR ELECTRIC VEHICLE

(71) Applicants: Hyundai Motor Company, Seoul (KR); Kia Motors Corporation, Seoul (KR)

(72) Inventors: Jin Ho Kim, Whasung-Si (KR); Jae Joon Lee, Whasung-Si (KR); Jong Sool Park, Whasung-Si (KR); Jin Young Hwang, Whasung-Si (KR); Jong Sung Kim, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/884,306

(22) Filed: May 27, 2020

(30) Foreign Application Priority Data

Dec. 12, 2019 (KR) ........................ 10-2019-0165279

(51) Int. Cl.
*F16H 37/06* (2006.01)
*F16H 3/44* (2006.01)
*F16H 37/04* (2006.01)

(52) U.S. Cl.
CPC ............. *F16H 3/44* (2013.01); *F16H 37/046* (2013.01); *F16H 37/06* (2013.01); *F16H 37/065* (2013.01); *F16H 2003/445* (2013.01); *F16H 2037/048* (2013.01); *F16H 2200/0056* (2013.01); *F16H 2200/2005* (2013.01); *F16H 2200/2094* (2013.01); *F16H 2200/2097* (2013.01)

(58) Field of Classification Search
CPC ............... F16H 3/44; F16H 2200/2005; F16H 2200/0056; F16H 2003/445; F16H 37/06; F16H 37/065; F16H 37/046; F16H 2200/2094; F16H 2200/2097
USPC .................... 475/218, 151; 74/329, 330, 331
See application file for complete search history.

(56) References Cited

U.S. PATENT DOCUMENTS

| | | | |
|---|---|---|---|
| 9,260,109 B2 | 2/2016 | Tanaka | |
| 9,346,462 B2 | 5/2016 | Park | |
| 9,528,583 B2 | 12/2016 | Lubke et al. | |
| 2003/0100395 A1 | 5/2003 | Hiraiwa | |
| 2006/0025272 A1* | 2/2006 | Pelouch | F16H 37/046 475/214 |
| 2008/0108467 A1 | 5/2008 | Hiraki et al. | |
| 2008/0194369 A1 | 8/2008 | Boutou et al. | |
| 2008/0200296 A1 | 8/2008 | Holmes | |
| 2009/0151491 A1 | 6/2009 | Tabata et al. | |
| 2010/0051360 A1 | 3/2010 | Oba et al. | |
| 2015/0068336 A1* | 3/2015 | Peterson | F16H 3/006 74/330 |

(Continued)

FOREIGN PATENT DOCUMENTS

KR 10-2013-0117184 A 10/2013
KR 10-2014-0118028 A 10/2014

*Primary Examiner* — Roger L Pang
(74) *Attorney, Agent, or Firm* — Morgan, Lewis & Bockius LLP

(57) ABSTRACT

A planetary gear set may include a first rotation element connected to a first shaft and having a second rotation element connected to a second shaft, among three rotation elements; a motor; a first shifting device configured to be selectively engaged to the motor to deliver the power of the motor to the first shaft directly or at a reduced speed; and a second shifting device provided to be configured to selectively deliver the power of the motor to the first shaft or the second shaft.

19 Claims, 1 Drawing Sheet

(56) References Cited

U.S. PATENT DOCUMENTS

| | | |
|---|---|---|
| 2016/0312857 A1 | 10/2016 | Wechs |
| 2017/0009862 A1* | 1/2017 | Gumpoldsberger .... F16H 3/006 |
| 2017/0159779 A1* | 6/2017 | Hwang ................... F16H 3/006 |
| 2017/0282700 A1 | 10/2017 | Bergquist et al. |
| 2019/0118635 A1* | 4/2019 | Hwang .................... B60K 6/48 |
| 2020/0047602 A1* | 2/2020 | Chae ....................... F16H 3/093 |

* cited by examiner

| SHIFT STAGE | | | SH1 | | SH2 | | SH3 | |
|---|---|---|---|---|---|---|---|---|
| | CL1 | CL2 | S1 | S3 | S2 | S4 | low | high |
| 1 | ● | | ● | | | | ● | |
| 2 | | ● | | | ● | | ● | |
| 3 | ● | | | ● | | | ● | |
| 4 | | ● | | | | ● | ● | (*) |
| 5 | ● | | ● | | | | | ● |
| 6 | | ● | | | ● | | | ● |
| 7 | ● | | | ● | | | | ● |

POWER TRAIN FOR ELECTRIC VEHICLE

CROSS REFERENCE TO RELATED APPLICATION

The present application claims priority of Korean Patent Application No. 10-2019-0165279 filed on Dec. 12, 2019, the entire contents of which is incorporated herein for all purposes by this reference.

BACKGROUND OF THE PRESENT INVENTION

Field of the Invention

The present invention relates to a power train mounted to an electric vehicle.

Description of Related Art

An electric vehicle is a vehicle which provides a driving force of a vehicle with the power of an electric motor, and may contribute to environmental pollution improvement in a large city in that there is no exhaust gas.

To popularize the electric vehicle as described above, various technologies need to be improved, but a technology capable of drastically improving the distance to empty after once charged is required.

To increase the distance to empty as described above, it is required to satisfy the maximum uphill performance and the highest speed performance required by a vehicle even while improving fuel efficiency (mileage per unit power km/kWh) by reducing the size and capacity of a motor mounted to the electric vehicle, and thus, to this end, the electric vehicle is provided with a transmission.

For the above reason, the transmission mounted to the electric vehicle is a configuration as simple as possible, and does not occur a torque interruption in which the torque delivered to a driving wheel is interrupted during the shift or a shift shock even while having high power delivery efficiency.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power train for an electric vehicle, which may satisfy the maximum uphill performance and the highest vehicle speed performance required for a vehicle even while reducing the capacity of a motor by providing a plurality of transmission ratios, improve fuel efficiency of the vehicle by implementing high power delivery efficiency with a relative simple configuration and a small weight, and reduce or prevent a torque interruption and a shift shock.

A power train for an electric vehicle according to an exemplary embodiment of the present invention for achieving the object is configured to include a planetary gear set having a first rotation element connected to a first shaft and having a second rotation element connected to a second shaft, among three rotation elements; a motor; a first shifting device configured to be selectively engaged to the motor to deliver the power of the motor to the first shaft directly or at a reduced speed; and a second shifting device provided to be configured to selectively deliver the power of the motor to the first shaft or the second shaft.

A third rotation element of the planetary gear set may be connected to a third shaft, and the third shaft may be selectively connectable to a transmission housing.

Any two of three rotation elements of the planetary gear set may be configured to be connected to each other so that all the rotation elements of the planetary gear set may be rotated integrally.

The power train for the electric vehicle may include a third shifting device configured to switch a state of fixing the third shaft to the transmission housing or a state of connecting the third shaft to the second shaft.

Furthermore, the present invention may be configured to include a power distribution device provided to be configured to deliver the power of the motor to all or any one of both the first shifting device and the second shift device.

The power distribution device may include a first clutch and a second clutch configured to independently connect or disconnect a rotation shaft of the motor to a fourth shaft and a fifth shaft mounted concentrically with each other, respectively.

The fourth shaft may be mounted to be coaxial with the first shaft, and the first shifting device may be mounted to the fourth shaft.

A first gear may be rotatably mounted to the fourth shaft, a second gear externally engaged to the first gear may be mounted to a sixth shaft parallel to the fourth shaft with rotation restricted, a third gear may be mounted to the sixth shaft with rotation restricted, a fourth gear externally engaged to the third gear may be mounted to the first shaft with rotation restricted, and the first shifting device may be configured to include a sleeve for selectively connecting a clutch gear of the first gear or a clutch gear of the fourth gear with respect to a hub fixedly connected to the first shaft.

The second shifting device may be connected in an external gear manner with the fifth shaft and mounted to a seventh shaft parallel to the first shaft.

A fifth gear may be provided to the fifth shaft,
a sixth gear engaged to the fifth gear may be provided to the seventh shaft,
a ninth gear and a tenth gear rotatably mounted to the seventh shaft, and engaged to a seventh gear with rotation restricted to the first shaft and an eighth gear with rotation restricted to the second shaft, respectively, may be provided, and the second shifting device may be configured to include a sleeve for selectively connecting a clutch gear of the ninth gear or a clutch gear of the tenth gear with respect to a hub with rotation restricted to the seventh shaft.

Furthermore, a power train for the electric vehicle according to an exemplary embodiment of the present invention for achieving the object is configured to include a planetary gear set having a first rotation element connected to a first shaft, having a second rotation element connected to a second shaft, and having a third rotation element connected to a third shaft, among three rotation elements; a motor; a first shifting device configured to deliver the power of the motor to the first shaft directly or at a reduced speed; a second shifting device provided to be configured to selectively deliver the power of the motor to the first shaft or the second shaft; and a power distribution device provided to be configured to deliver the power of the motor to all or any one of both the first shifting device and the second shift device, and any two of three rotation elements of the planetary gear set may be connected to each other, and the third rotation element of the planetary gear set may be fixedly connected to a transmission housing.

The present invention may satisfy the maximum uphill performance and the highest vehicle speed performance required for the vehicle even while reducing the capacity of the motor by providing the plurality of transmission ratios, improve fuel efficiency of the vehicle by implementing high power delivery efficiency with the relative simple configuration and the small weight, and reduce or prevent the torque interruption and the shift shock.

The methods and apparatuses of the present invention have other features and advantages which will be apparent from or are set forth in more detail in the accompanying drawings, which are incorporated herein, and the following Detailed Description, which together serve to explain certain principles of the present invention.

Figures 1, 2:
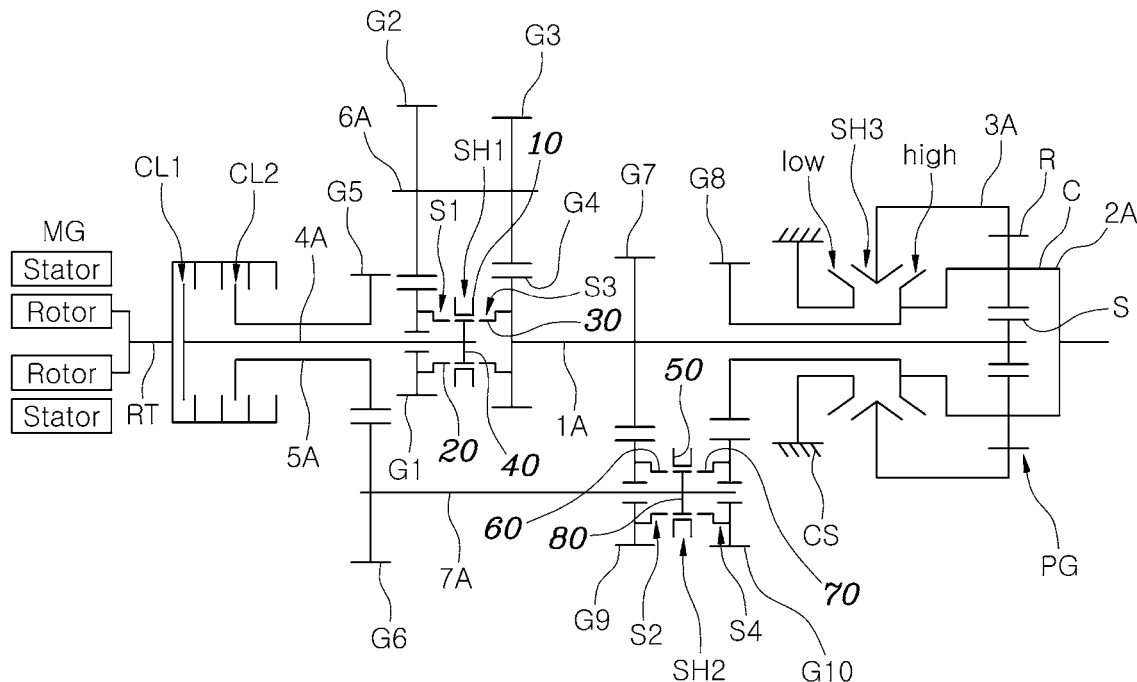
FIG. 1 is a diagram showing various exemplary embodiments of a power train for an electric vehicle according to an exemplary embodiment of the present invention.
FIG. 2 is an operation mode table summarizing a shift stage implemented by the power train in FIG. 1.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, an exemplary embodiment of a power train for an electric vehicle according to an exemplary embodiment of the present invention is configured to include a planetary gear set PG having a first rotation element connected to a first shaft 1A and having a second rotation element connected to a second shaft 2A, among three rotation elements; a motor MG; a first shifting device SH1 mounted to selectively deliver the power of the motor MG to the first shaft 1A directly or at a reduced speed; and a second shifting device SH2 provided to selectively deliver the power of the motor MG to the first shaft 1A or the second shaft 2A.

A third rotation element of the planetary gear set PG is connected to a third shaft 3A, and the third shaft 3A is selectively connectable to a transmission housing CS.

Furthermore, any two of three rotation elements of the planetary gear set PG are connected to each other so that all the rotation elements of the planetary gear set PG may be rotated integrally.

The exemplary embodiment includes a third shifting device SH3 which may switch a state of fixing the third shaft 3A to a transmission housing CS and a state of connecting the third shaft 3A to the second shaft 2A so that a function of fixing the third shaft 3A to the transmission housing CS and a function of integrating the planetary gear set PG by connecting any two rotation elements of the planetary gear set PG to each other may be performed together.

Furthermore, the exemplary embodiment of the present invention is configured to include a power distribution device provided to be configured to deliver the power of the motor MG to all or any one of both the first shifting device SH1 and the second shifting device SH2.

That is, if the first shaft 1A is regarded as an input shaft receiving the power from the motor MG, and the second shaft 2A is regarded as an output shaft configured for receiving the power from the motor MG and simultaneously outputting the power, the present invention distributes the power of the motor MG to the first shifting device SH1 and the second shifting device SH2 with the power distribution device, and adjusts the power of the motor MG input to the first shaft 1A through the first shifting device SH1 and the power of the motor MG input to the first shaft 1A or the second shaft 2A through the second shifting device SH2 in the planetary gear set PG to output it through the second shaft 2A.

For reference, the first shaft 1A, the second shaft 2A, and the third shaft 3A are all mounted concentrically with each other as the rotation shafts of the rotation elements of the planetary gear set PG, and a first rotation element of the planetary gear set PG may be represented by a sun gear S, a second rotation element may be represented by a planet carrier C, and a third rotation element may be represented by a ring gear R.

The power distribution device includes a first clutch CL1 and a second clutch CL2 provided to independently connect or disconnect the rotation shaft RT of the motor MG to a fourth shaft 4A and a fifth shaft 5A mounted concentrically with each other, respectively.

As shown in FIG. 1, the first clutch CL1 and the second clutch CL2 may be configured as a dual clutch including a single package, and the first clutch CL1 and the second clutch CL2 may independently connect or block the power of the motor MG to the fourth shaft 4A and the fifth shaft 5A, respectively, as described above, implementing both a state of delivering the power of the motor MG to the fourth shaft 4A or the fifth shaft 5A and a state of simultaneously delivering the power of the motor MG to the fourth shaft 4A and the fifth shaft 5A.

The fourth shaft 4A is mounted concentrically with the first shaft 1A, and the first shifting device SH1 is mounted to the fourth shaft 4A.

That is, a first gear G1 is rotatably mounted to the fourth shaft 4A; a second gear G2 externally engaged to the first gear G1 is mounted to a sixth shaft 6A parallel to the fourth shaft 4A with rotation restricted; a third gear G3 is mounted to the sixth shaft 6A with rotation restricted; a fourth gear G4 externally engaged to the third gear G3 is mounted to the first shaft 1A with rotation restricted; and the first shifting device SH1 is configured to include a sleeve 10 for selectively connecting a clutch gear 20 of the first gear G1 or a clutch gear 30 of the fourth gear G4 with respect to a hub 40 with rotation fixedly connected to the first shaft 1A.

Therefore, in a state where the first clutch CL1 is fastened and the power of the motor MG is delivered to the fourth shaft 4A, if the sleeve of the first shifting device SH1 is engaged to the clutch gear of the first gear G1, the power of the motor MG is delivered to the first shaft 1A at a reduced speed through the first gear G1, the second gear G2, the third gear G3, and the fourth gear G4, and if the sleeve is engaged to the clutch gear of the fourth gear G4, the power of the motor MG is directly delivered from the fourth shaft 4A to the first shaft 1A.

The second shifting device SH2 is connected to the fifth shaft 5A in an external gear manner and is mounted to a seventh shaft 7A parallel to the first shaft 1A.

That is, a fifth gear G5 is provided to the fifth shaft 5A; a sixth gear G6 engaged to the fifth gear G5 is provided to the seventh shaft 7A; a ninth gear G9 and a tenth gear G10 rotatably mounted to the seventh shaft 7A, and engaged to a seventh gear G7 with rotation restricted to the first shaft 1A and an eighth gear G8 with rotation restricted to the second shaft 2A, respectively, are provided; and the second shifting device SH2 is configured to include a sleeve 50 for selectively connecting a clutch gear 60 of the ninth gear G9 or a clutch gear 70 of the tenth gear G10 with respect to a hub 80 with rotation restricted to the seventh shaft 7A.

Therefore, in a state where the second clutch CL2 is fastened, and the power of the motor MG is delivered to the seventh shaft 7A, if the sleeve of the second shifting device SH2 is engaged to the clutch gear of the ninth gear G9, the power of the motor MG is delivered to the first shaft 1A through the ninth gear G9 and the seventh gear G7, and if the sleeve is engaged to the clutch gear of the tenth gear G10, the power of the motor MG is delivered to the second shaft 2A through the tenth gear G10 and the eighth gear G8.

FIG. 2 is an operation mode table in which the power train for the electric vehicle according to an exemplary embodiment of the present invention configured as described above implements the shifting stages of first to seventh stages, and a shift process of the power train according to an exemplary embodiment of the present invention will be described with reference to FIG. 2.

S1 in the operation mode table represents that the sleeve of the first shifting device SH1 is connected or disconnected to the clutch gear of the first gear G1 and may be regarded as a clutch for implementing first and fifth shifting stages; S2 represents that the sleeve of the second shaft device SH2 is connected or disconnected to the clutch gear of the ninth gear G9 and may be regarded as a clutch for implementing the second and sixth shifting stages; S3 represents that the sleeve of the first shifting device SH1 is connected or disconnected to the clutch gear of the fourth gear G4 and may be regarded as a clutch for implementing the third and seventh shifting stages; and S4 represents that the sleeve of the second shifting device SH2 is connected or disconnected to the clutch gear of the tenth gear G10 and may be regarded as a clutch for implementing the fourth shifting stage.

The third shifting device SH3 is to implement a state where in the LOW state, by fixing the third shaft 3A to the transmission housing CS, the planetary gear set PG outputs the power input to the first shaft 1A to the second shaft 2A at a reduced speed, and a state where in the HIGH state, by connecting the third shaft 3A to the second shaft 2A, the planetary gear set PG outputs the power input to the first shaft 1A or the second shaft 2A to the second shaft 2A as it is.

Here, the third shifting device SH3 continuously maintains the LOW state during the first to fourth stages, and after changed to the HIGH state in the fourth stage, continuously maintains the HIGH state during the remaining fifth to seventh stages which are high stages.

Looking at the shift of the first to fourth stages, while the third shifting device SH3 maintains the LOW state as described above, the sleeve of the first shifting device SH1 is engaged to the clutch gear of the first gear G1 in implementing the first stage; the sleeve of the second shifting device SH2 is engaged to the clutch gear of the ninth gear G9 in implementing the second stage; the sleeve of the first shifting device SH1 is engaged to the clutch gear of the fourth gear G4 in implementing the third stage; and the sleeve of the second shifting device SH2 is engaged to the clutch gear of the tenth gear G10 in implementing the fourth stage.

That is, in a state which is mounted so that the first shifting device SH1 may implement the first stage and the third stage and the second shifting device SH2 may implement the second stage and the fourth stage, the first clutch CL1 and the second clutch CL2 are fastened alternately so that the first stage to the fourth stage may be implemented.

This implements so called "CLUTCH TO CLUTCH" shift in a manner of fastening the second clutch CL2 while releasing the first clutch CL1 after engaging the second stage with the second shifting device SH2 in advance during running at the first stage with the first shifting device SH1, smoothly shifting without torque interruption, and a shift process of the remaining second stage to the fourth stage is also performed by the same principle.

In the fourth shifting stage state, in a state where the shift has been made from the initial third shifting stage to the fourth shifting stage, the third shifting device SH3 is in the LOW state, but the third shifting device SH3 may be switched to the HIGH state in advance in the fourth stage state for the shifting to the fifth stage.

At the present time, since the power from the motor MG is delivered to the second shaft 2A through the tenth gear G10 and the eighth gear G8 and is output as it is, the third shifting device SH3 may be changed from the LOW state to the HIGH state without torque interruption.

While the shift process from the fourth shifting stage state to the seventh shifting stage also maintains the third shifting device SH3 in the HIGH state, the sleeve of the first shifting device SH1 is engaged to the clutch gear of the first gear G1 in implementing the fifth stage; the sleeve of the second shifting device SH2 is engaged to the clutch gear of the ninth gear G9 in implementing the sixth stage; and the sleeve of the first shifting device SH1 is engaged to the clutch gear of the fourth gear G4 in implementing the seventh stage.

Of course, the substantial shift is achieved by releasing any one of the first clutch CL1 and the second clutch CL2 and simultaneously coupling the other one in a state where the gear has been engaged as described above, and the torque interruption during the shift does not occur.

, in an exemplary embodiment of the present invention, the seventh stage, which is the highest stage, has the fourth shaft 4A directly connected to the first shaft 1A, and the planetary gear set PG may be integrally rotated, such that the power of the motor MG becomes the same state as directly connected to the second shaft 2A, which is an output shaft, without the shift, maximizing fuel efficiency of the electric vehicle at very high power delivery efficiency.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power train apparatus for a vehicle, the power train apparatus comprising:
   a planetary gear set having three rotation elements having a first rotation element, a second rotation element, and a third rotation element, wherein the first rotation element is connected to a first shaft and the second rotation element is connected to a second shaft;
   a motor;
   a first shifting device configured to be selectively engaged to the motor to deliver a power of the motor to the first shaft directly or at a reduced speed;
   a second shifting device provided to selectively deliver the power of the motor to the first shaft or the second shaft; and
   a power distribution device provided to deliver the power of the motor to all or one of the first shifting device and the second shift device.

2. The power train apparatus for the vehicle according to claim 1,
   wherein the third rotation element of the planetary gear set is connected to a third shaft, and
   wherein the third shaft is selectively connectable to a transmission housing.

3. The power train apparatus for the vehicle according to claim 2,
   wherein two of the three rotation elements of the planetary gear set are configured to be engaged to each other so that the three rotation elements of the planetary gear set is rotated integrally.

4. The power train apparatus for the vehicle according to claim 3, including:
   a third shifting device configured to switch a state of fixing the third shaft to the transmission housing or a state of connecting the third shaft to the second shaft.

5. The power train apparatus for the vehicle according to claim 1, wherein the power distribution device includes:
   a first clutch configured to selectively connect a rotation shaft of the motor to a fourth shaft; and
   a second clutch configured to selectively connect the rotation shaft of the motor to a fifth shaft mounted concentrically with the fourth shaft.

6. The power train apparatus for the vehicle according to claim 5,
   wherein the fourth shaft is mounted to be coaxial with the first shaft, and
   wherein the first shifting device is mounted to the fourth shaft.

7. The power train apparatus for the vehicle according to claim 6,
   wherein a first gear is rotatably mounted to the fourth shaft,
   wherein a second gear engaged to the first gear is fixedly connected to a sixth shaft in parallel to the fourth shaft,
   wherein a third gear is fixedly connected to the sixth shaft, and
   wherein a fourth gear engaged to the third gear is fixedly connected to the first shaft.

8. The power train apparatus for the vehicle according to claim 7, wherein the first shifting device includes a sleeve for selectively connecting a clutch gear of the first gear or a clutch gear of the fourth gear to a hub fixedly connected to the first shaft.

9. The power train apparatus for the vehicle according to claim 7,
   wherein the second shifting device is engaged with the fifth shaft and mounted to a seventh shaft parallel to the first shaft.

10. The power train apparatus for the vehicle according to claim 9,
    wherein a fifth gear is fixedly connected to the fifth shaft,
    wherein a sixth gear engaged to the fifth gear is fixedly connected to the seventh shaft,
    wherein a ninth gear is rotatably mounted to the seventh shaft, and engaged to a seventh gear fixedly connected to the first shaft, and
    wherein a tenth gear is rotatably mounted to the seventh shaft, and engaged to an eighth gear fixedly connected to the second shaft.

11. The power train apparatus for the vehicle according to claim 10,
    wherein the second shifting device includes a sleeve for selectively connecting a clutch gear of the ninth gear or a clutch gear of the tenth gear to a hub fixedly connected to the seventh shaft.

12. The power train apparatus for the vehicle according to claim 1,
    wherein the first rotation element is a sun gear, the second rotation element is a planet carrier, and the third rotation element is a ring gear.

13. A power train apparatus for a vehicle, the power train apparatus comprising:
    a planetary gear set having three rotation elements including a first rotation element connected to a first shaft, a second rotation element connected to a second shaft, and a third rotation element connected to a third shaft;
    a motor;
    a first shifting device configured to deliver a power of the motor to the first shaft directly or at a reduced speed;
    a second shifting device provided to selectively deliver the power of the motor to the first shaft or the second shaft; and a power distribution device provided to deliver the power of the motor to all or one of first shifting device and the second shift device, wherein two of the three rotation elements of the planetary gear set are engaged to each other, and the third rotation element of the planetary gear set is fixedly connected to a transmission housing.

14. The power train apparatus for the vehicle according to claim 13, wherein the power distribution device includes:
   a first clutch configured to selectively engage the motor to the first shifting device; and
   a second clutch configured to selectively engage the motor to the second shifting device.

15. The power train apparatus for the vehicle according to claim 13, including:
   a third shifting device configured to switch a state of fixing the third shaft to the transmission housing or a state of connecting the third shaft to the second shaft.

16. The power train apparatus for the vehicle according to claim 14,
   wherein the first rotation element is a sun gear, the second rotation element is a planet carrier, and the third rotation element is a ring gear.

17. A power train apparatus for a vehicle, the power train apparatus including:
   a planetary gear set having a sun gear connected to a first shaft and a planet carrier connected to a second shaft;
   a motor;
   a first shifting device configured to be selectively engaged to the motor to deliver a power of the motor to the first shaft directly or at a reduced speed;
   a second shifting device provided to selectively deliver the power of the motor to the first shaft or the second shaft; and
   a power distribution device provided to deliver the power of the motor to all or one of the first shifting device and the second shift device.

18. The power train apparatus for the vehicle according to claim 17, wherein the power distribution device includes:
   a first clutch configured to selectively engage the motor to the first shifting device; and
   a second clutch configured to selectively engage the motor to the second shifting device.

19. The power train apparatus for the vehicle according to claim 17, including:
   a third shifting device configured to switch a state of fixing the third shaft to a transmission housing or a state of connecting the third shaft to the second shaft, wherein the third shaft is connected to a ring gear engaged to the planet carrier.

* * * * *